Figure 1:
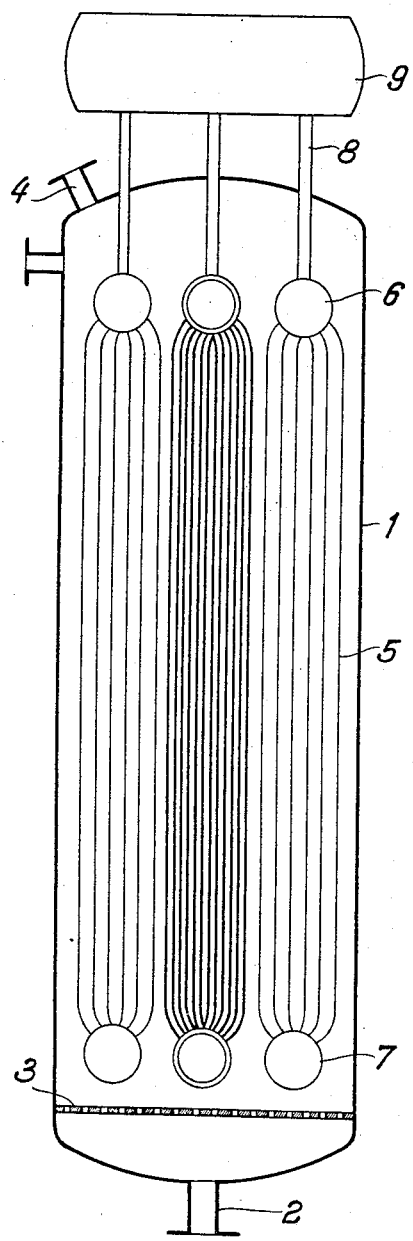

Sept. 16, 1958     H. KOLBEL ET AL     2,852,350

CARBON MONOXIDE HYDROGENATION SYNTHESIS REACTORS

Filed Dec. 22, 1953

Inventor:

United States Patent Office 2,852,350
Patented Sept. 16, 1958

2,852,350

CARBON MONOXIDE HYDROGENATION SYNTHESIS REACTORS

Herbert Kolbel, Moers, and Robert Langheim, Homberg (Lower Rhine), Germany, assignors to Rheinpreussen Aktiengesellschaft für Bergbau und Chemie, Homberg (Lower Rhine), Germany Application December 22, 1953, Serial No. 399,784

Claims priority, application Germany December 27, 1952

2 Claims. (Cl. 23—288)

This invention relates generally to improvements in carbon monoxide hydrogenation synthesis reactors and more particularly to improvements in the cooling system for synthesis reactors for effecting the hydrogenation of carbon monoxide in the form of a liquid suspension of catalyst.

The catalytic hydrogenation of carbon monoxide in accordance with the Fischer-Tropsch process, and the synthesis reactors or furnaces for effecting this hydrogenation are well known, but, the removal of the heat of reaction has always been one of the most difficult technical problems encountered. The synthesis process in which the catalyst is suspended in the reactor in a body of liquid, such as a hydrocarbon, is the most favorable for heat removal. Even when operating in this manner in the case of very active, highly fortified catalysts over-heating can occur if there is not sufficient cooling. This overheating will generally cause the formation of a relatively large amount of methane and cause the deposition of carbon, thereby reducing the yield and shortening the life of the catalyst.

Figure 2:
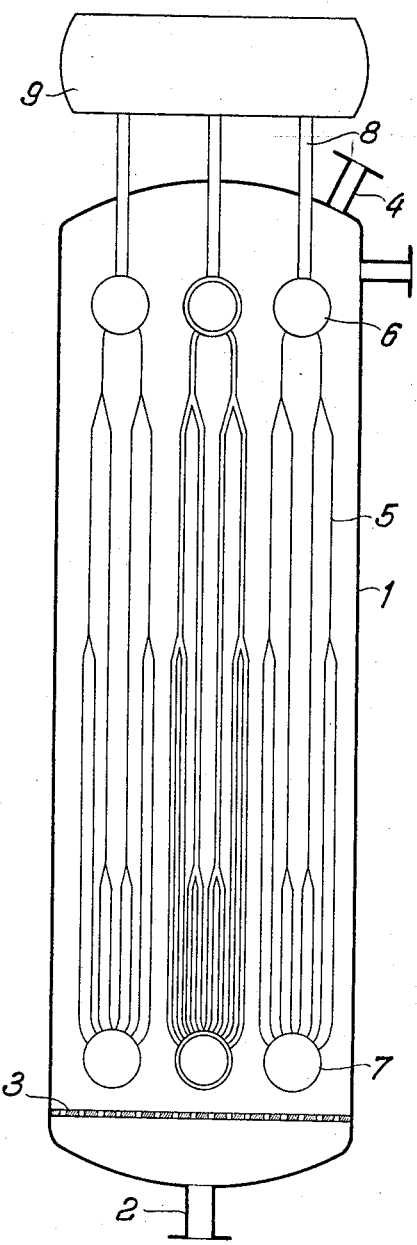

An object of this invention is to prevent the above mentioned over-heating and to provide a cooling for synthesis reactors for carbon monoxide hydrogenation, using a liquid suspension of catalyst by means of which the synthesis of the hydrocarbons takes place under particularly favorable conditions. These, and still further objects will become apparent from the following description read in conjunction with the drawing, in which:

Fig. 1 is a diagrammatic, vertical cross-section of an embodiment of a conventional synthesis reactor for effecting carbon monoxide hydrogenation, using a liquid suspension of a hydrogenation catalyst; and Fig. 2 is a diagrammatic, vertical cross-section of an embodiment of a similar reactor with a cooling system in accordance with the invention.

It has now been found in accordance with the invention that the catalytic hydrogenation of carbon monoxide, using a liquid suspension of catalyst, may be effected in a particularly favorable manner with complete avoidance of overheating if the liquid suspension of catalyst in the reactor is cooled with cooling elements whose cooling surface is reduced in an upward direction. This reduction of the cooling surface of the cooling elements is effected step-wise from the bottom to the top.

The cooling elements in accordance with the invention may consist of the conventional vertical or bundles of vertical cooling pipes, which extend longitudinally through the reaction space of the reactor. These vertical cooling pipes reduce their cooling surface from the bottom to the top, for example, by having two or more cooling pipes combined into a single or a smaller number of cooling pipes, or by constructing a cooling system of several short cooling packages whose cooling surfaces have the desired decreasing sizes from the bottom to the top.

The conventional synthesis reactor for effecting carbon monoxide hydrogenation using a liquid suspension of catalyst, as shown in Fig. 1, consists of a vertical reaction chamber 1 having a synthesis gas inlet 2 at its bottom and an exit or final gas outlet 4 at its top. A plate 3 provided with orifices or nozzles for the gas distribution is positioned across the bottom of the reaction chamber and above gas inlet 2. The liquid suspension of the catalyst, for example, a 10% suspension of an iron catalyst, referring to the iron, in a hydrocarbon oil boiling in the range 250° C. to 400° C. is maintained in the reaction chamber above plate 3. The gas entering through inlet conduit 2 bubbles through the orifice openings or nozzles in plate 3 and up through the catalyst suspension. Extending longitudinally through the reaction chamber and thus surrounded by the catalyst suspension is a multiple number of vertical bundles of cooling tubes 5 which terminate at their upper ends in cooling liquid outlet manifolds 6 and at their lower ends in cooling liquid inlet manifolds 7. The cooling liquid flows through manifolds 7 into and through the vertical cooling pipes 5 to outlet manifold 6 from which the hot liquid enters through the conduits 8 in the vapor collecting chamber 9. After having passed a heat exchanger, not shown in the drawing, the cooling liquid re-enters the cooling pipes through the inlet manifolds 7. As the cooling liquid passes through the vertical cooling pipes 5, the catalyst suspension is cooled by indirect heat transfer.

In the embodiment of the invention shown in Fig. 2, the cooling surfaces of these vertical cooling pipes 5 decreases in an upward direction from the bottom to top. This reduction in the effective cooling surface is caused by having two or more of the pipes combine into a single pipe or a smaller number of pipes at various distances in upward direction. Thus, for example, in the first quarter of a height of the reactor, the number of the tubes is reduced by a quarter by having pairs of the tubes combine into single tubes. At one-half the height of the reactor, the number of initial vertical tubes 5 at the bottom is divided in half by again having pairs of tubes join into a single tube. At the upper three-fourths of the height of the reactor, pairs of tubes again join, so that only one-quarter of the initial number of tubes remains. Apart from the particular way in which the cooling is effected the method of the invention does not differ from the conventional methods of carbon monoxide hydrogenation in a liquid medium, i. e., the reaction expedients are identical. Thus, gases containing carbon monoxide and hydrogen in the volume ratio of 2:1 to 1:2 are suitable for the process. The temperatures at which the reaction is conducted usually range from 200° to 360° C. The reaction may be carried out under pressures in the range of 2–100 atmospheres. The use of pressures of more than 25 atmospheres has no advantage when the synthesis is directed to the preferred production of hydrocarbons. If the formation of oxygen containing hydrocarbon derivates is desired, higher pressures especially pressures in the range of 10 to 50 atmospheres are useful. The catalyst useful in accordance with the invention may be any suitable catalyst conventionally employed for carbon monoxide hydrogenation in accordance with the Fischer-Tropsch type synthesis. Such catalysts contain, as is known, metals of the 8th group of the periodic system of the elements, such as iron, nickel, cobalt or ruthenium. In accordance with the preferred embodiment, however, it is preferred to use an iron catalyst. Iron type catalyst may be obtained from ferric oxides obtained or processed from other types of iron compounds such as iron salts under particularly careful manufacturing conditions in accordance with well known practice. Such type iron catalysts obtained from ferric oxides are of exceptionally high activity.

These catalysts are suspended in an inert liquid, such as a high-boiling hydrocarbon mixture of the boiling range 250° C. to 400° C. The catalyst suspension may contain 50 to 500 grams Fe per liter suspension.

As cooling liquids, may be used water, hydrocarbon oils of aliphatic or aromatic character, the use of water being preferred.

The advantages of the invention will be described in further detail on the basis of the following comparative examples:

*Example*

A vertical synthesis furnace is used, which has a height of 12 meters and a diameter of 1.40 meters, and contains 360 water-cooled pipes (Fig. 1). This reactor is filled with a catalyst suspension containing 10% of iron. The catalyst had been precipitated with ammonium hydroxide solution from a watery solution of $Fe(NO_3)_3$ and $Cu(NO_3)_2$. The precipitated metal hydroxides were filtered off and alkalized with a watery solution of potassium carbonate. This catalyst mass was dried at 80° C. and contained, in addition to iron, 0.05% by weight of copper and 0.5% by weight of potassium carbonate, calculated on 100 grams of iron. The catalyst was suspended in an aliphatic hydrocarbon fraction of the boiling range 280° C. to 360° C. The catalyst was of the type of a gasolineforming catalyst, since 80-85% of the usfeul products ($C_3$ and higher) boiled below 200° C. With the CO-rich synthesis gas set forth in the following table, there is obtained at a temperature of 267° C. in the cooling system, a pressure of 10 atmospheres and with a gas load of 2.2 normal liter $CO+H_2$ per hour per gram Fe, a CO conversion of more than 90%, as can be noted from the "Exit Gas Analysis I" set forth in the table. The performance of the catalyst until its exhaustion is about 400 kg. hydrocarbons per kg. Fe.

If now, in accordance with the present invention, the number of cooling tubes is reduced about 3 meters from the synthesis gas inlet from 360 to 270, after a further 3 meters to 180, and finally, after a further 3 meters, to 90 (Fig. 2), the results of the synthesis with the same contact and synthesis gas and with the same load the synthesis pressure being also the same are substantially more favorable, as shown by the value of the "Exit Gas Analysis II" set forth in the table. With a lower temperature in the cooling system, there is obtained a higher CO conversion, and, in particular, substantially less methane is formed.

Furthermore, the value for the unsaturated $C_3+C_4$ hydrocarbons is substantially higher. Furthermore, the performance of the catalyst due to the smaller methane formation and its greater life has risen about 50% to 600 kg. hydrocarbon per kg. Fe.

*Table*

| | Temp., °C | $CO_2$ | $C_3+C_4$-Olefins | $C_2$ | CO | $H_2$ | Saturated Hydrocarbons | $N_2$ | CO-Conversion in percent | Grams $CH_4$ Per Cubic Meter (NTP) $CO+H_2$ | Grams $C_3+$ Per Cubic Meter (NTP) $CO+H_2$ |
|---|---|---|---|---|---|---|---|---|---|---|---|
| Synthesis Gas Analysis | | 4.0 | | | 56.3 | 34.5 | 0.2 | 5.0 | | | |
| Exit Gas Analysis I | 267 | 59.4 | 3.1 | 0.7 | 9.4 | 11.2 | 6.2 | 10.0 | 91.8 | 21.2 | 157.8 |
| Exit Gas Analysis II | 262 | 61.4 | 4.7 | 0.5 | 7.7 | 11.0 | 4.2 | 10.5 | 93.6 | 12.2 | 172.3 |

The data for the gas analysis are percent by volume. NTP signifies normal temperature and pressure conditions, i. e. measured at 0° C. and 760 mm. mercury. $C_3+$ signifies hydrocarbons with three and more carbon atoms in the molecule.

We claim:

1. In a synthesis furnace for the catalytic hydrogenation of carbon monoxide gas in a liquid suspension of catalyst comprising a vertical reaction chamber defining a container for said liquid suspension and having an inlet for said gas at its lower portion and an outlet for said gas at its upper portion, the improvement which comprises a multiple number of vertical bundles of cooling tubes longitudinally positioned within said reaction chamber, means for combining said tubes into a lesser number of tubes at vertical intervals through the height of said chamber, and means for passing coolant through said tubes.

2. In a synthesis furnace for the catalytic hydrogenation of carbon monoxide in a liquid suspension of catalyst in a vertical reaction chamber which contains said liquid suspension and has a gas inlet at its lower portion and a gas outlet at its upper portion; the improvement which comprises a multiple number of vertical bundles of cooling tubes longitudinally positioned within said reaction chamber, means for combining pairs of said cooling tubes into single tubes at vertical intervals in a upward direction, and means for passing a coolant through said tubes.

References Cited in the file of this patent

UNITED STATES PATENTS

| 1,772,972 | Volcker | Aug. 12, 1930 |
| 1,825,321 | La Mont et al. | Sept. 29, 1931 |
| 2,620,262 | Hujsak et al. | Dec. 2, 1952 |
| 2,686,044 | Maldague | Aug. 10, 1954 |

FOREIGN PATENTS

| 374,780 | France | Feb. 15, 1907 |
| 574,810 | Great Britain | Jan. 22, 1946 |